United States Patent [19]

Chielens

[11] 4,047,769
[45] Sept. 13, 1977

[54] APPARATUS FOR SUPPORTING A ROTARY BODY OF LARGE DIAMETER

[75] Inventor: Alain Chielens, Marcq-en-Baroeul, France

[73] Assignee: Fives-Cail Babcock, Paris, France

[21] Appl. No.: 658,362

[22] Filed: Feb. 17, 1976

[51] Int. Cl.² .......................... F16C 41/02; F16C 1/24
[52] U.S. Cl. ...................................... 308/121; 308/73; 308/160
[58] Field of Search .................. 308/36.1, 3 R, 3 C, 308/2, 8, 15, 72, 8, 106, 15, 36.1, 73, 121–123, 160

[56] References Cited

U.S. PATENT DOCUMENTS

| 3,023,329 | 2/1962 | Kamphaus | 308/73 |
| 3,093,426 | 6/1963 | Cornford | 308/73 |
| 3,258,300 | 6/1966 | Saunders | 308/73 |

Primary Examiner—Richard A. Bertsch
Attorney, Agent, or Firm—Kurt Kelman

[57] ABSTRACT

A large cylinder is supported for rotation on a stationary support frame which carries a support block glidingly contacting an annular raceway on the periphery of the cylinder. A swivel joint mounts the support block on the support frame and the pivoting center of the swivel joint is in or very close to the interface between the support block and the raceway.

6 Claims, 7 Drawing Figures

APPARATUS FOR SUPPORTING A ROTARY BODY OF LARGE DIAMETER

The present invention relates to improvements in apparatus for supporting a body of large diameter for rotation about an axis on an annular raceway coaxial with the axis of rotation.

The support is designed to absorb axial forces to which the rotating body is subjected and comprises a stationary support frame, at least one support block glidingly contacting the annular raceway, and a swivel or ball-and-socket joint mounting the support block on the support frame.

In conventional supports of this type, the pivoting center of the swivel joint, i.e. the center about which the ball pivots in the socket of the joint, is spaced from the interface between the support block and the raceway, i.e. it is positioned therebelow, so that each deformation of the supported body produces a displacement of the support block in relation to the rotary body and this, in turn, causes a shearing force to be exerted upon the lubricating film, i.e. the film of oil, provided at the interface to reduce friction thereat during rotation of the body. This shearing force may reduce the stability of the lubricating film and, consequently, the lubrication of the contacting gliding surfaces. Furthermore, each axial force exerted upon the support block has the tendency to make it wobble, which causes a non-uniform distribution of pressure over the width of the raceway. For these reasons, such apparatus has generally not been used for absorbing axial forces to which a rotating body may be subjected.

It is the primary object of this invention to improve apparatus of the indicated type so as to avoid the above disadvantages and to make it useful as a support in the axial direction.

This and other objects are accomplished by the invention by bringing the pivoting center of the swivel joint at least very close to, or into, the interface between the support block and the raceway.

The lubrication of the interface, along which the body glides during rotation in relation to the support block, may be effected in a known manner by means of lubricating oil introduced into a transverse groove recessed in the surface of the support block and not communicating with the lateral edges of the support block.

The absorb axial forces, a pair of circular flanges are provided on the periphery of the body to define the raceway therebetween, and the spacing between the flanges is such that some axial play is produced between the flanges and the support block, lubricant being fed to the interspace between the flanges and the support block.

An equivalent modification for absorbing axial forces consists of providing a pair of circular flanges along the lateral edges of the support block and to hold a projecting circular raceway on the periphery of the body between the flanges of the support block with some axial play.

The above and other objects, advantages and features of the present invention will become more apparent from the following description of a now preferred embodiment thereof, taken in conjunction with the accompanying drawing wherein FIG. 1 is an end elevational view of an apparatus according to the invention, showing approximately one quadrant of the supported body in transverse section;

Figure 1:
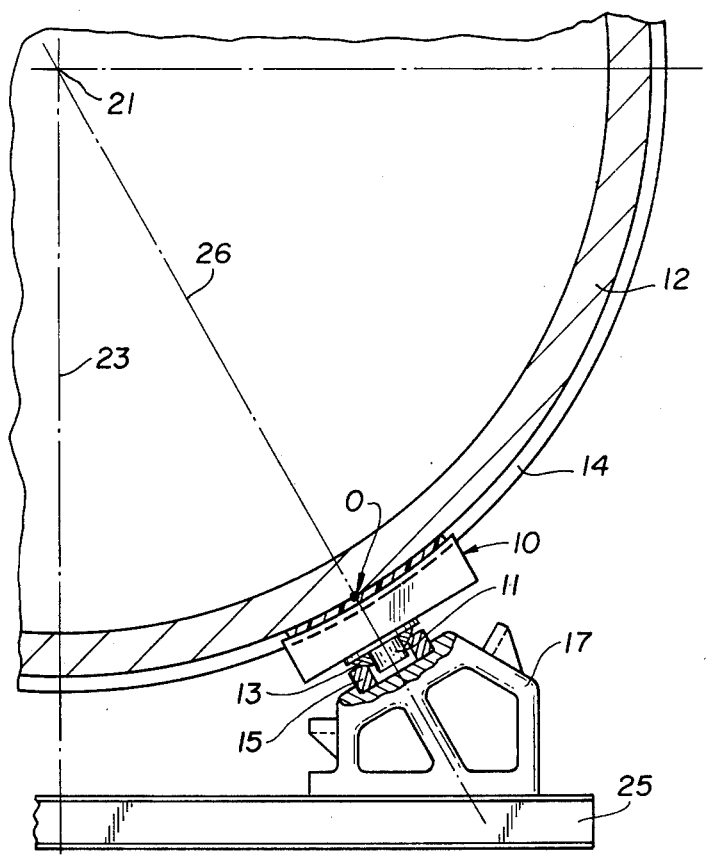
Figure 2:
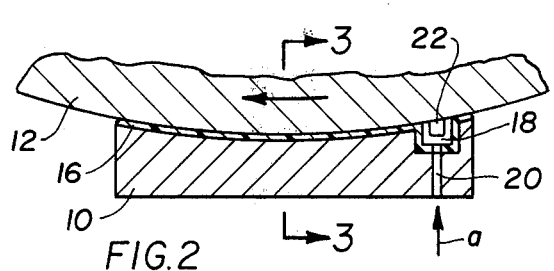
FIG. 2, is an enlarged longitudinal section of the support block and a portion of the body supported thereby.

Referring now to the drawing and first to FIG. 1, there is shown a body 12 of large diameter supported for rotation about axis 21. Only the right-hand lower quadrant of the body being shown, it will be understood that an identical support for the body is provided symmetrically in respect of vertical plane 23 on both sides of the plane, only the support in the right-hand quadrant being illustrated.

The illustrated support apparatus comprises support block 10 on which body 12 glides during rotation about axis 21. Body 12 has an annular raceway coaxial with axis 21 along the cylindrical periphery of the body and support block 10 has a conforming surface concentric about this axis for gliding contact between the raceway and the support block surface.

A swivel joint mounts support block 10 on stationary support frame 17 which is carried by base 25. The swivel joint comprises annular socket 15 affixed to support frame 17 and ball 13 affixed to support block 10, the socket forming a spherical seat for the ball to permit universal pivoting of the ball in the socket, the pivoting center O being located in radial plane 26 in the interface between support block 10 and the annular raceway on body 12. Peg 11 extends from support block 10 into a central bore in ball 13 to affix the support block to the ball.

The diameter of the ball-and-socket joint is between 0.7 and one times the width of the support block (measured parallel to the axis of rotating body 12). Instead of being located exactly in the interface between support block 10 and the annular raceway on body 12, pivoting center 0 of the joint may be radially slightly above or below this interface at a distance therefrom not exceeding a tenth of the support block width.

Figure 3:
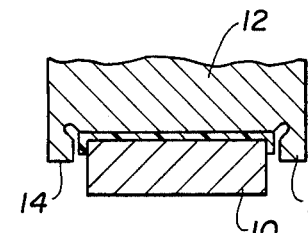
FIG. 3 is a section along line 3—3 of FIG. 2.
Figure 4:
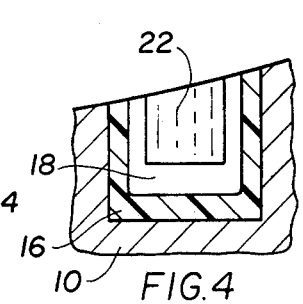
FIG. 4 is a further enlarged sectional view showing a structural detail of the support block.

A pair of circumferentially extending circular flanges 14, 14 on body 12 define the raceway therebetween and thus limit the axial displacement of support block 10. The spacing between the flanges is such as to provide some axial play between the flanges and the support block, as best shown in FIG. 3, i.e. the width of the raceway slightly exceeds that of the support block.

Figure 5:
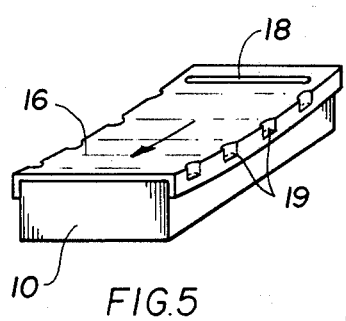
FIG. 5 illustrates the support block in a perspective view.
Figure 6:
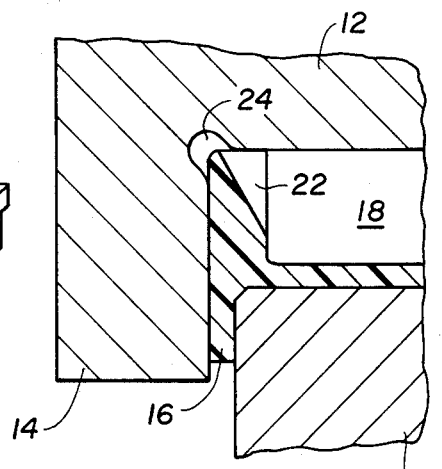
FIG. 6 is a further enlarged sectional view showing a structural detail in one position of the support block.
Figure 7:
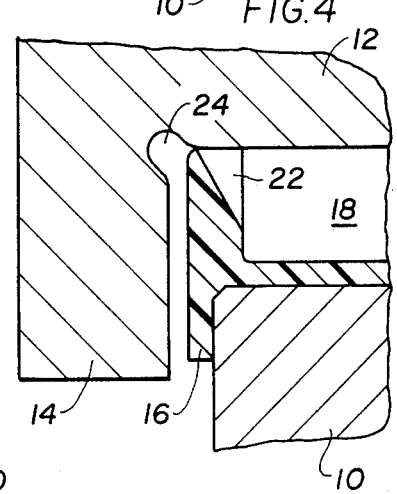
FIG. 7 is a like view showing another position of the support block.

In the illustrated embodiment, the surface of support block 10 in contact with the raceway and with the flanges is covered by anti-friction lining 16, as best shown in FIGS. 5 to 7. Cavities 19 along the lateral edges of the support block form oil reservoirs for lubricating the contacting surfaces of the support block and the rotating body.

The means for feeding the lubricant to the interspace between the flanges and support block is illustrated in FIGS. 2 to 7. The illustrated lubrication comprises transverse groove 18 extending in the direction of axis 21 and recessed in the gliding surface of support block 10 so as to be out of communication with the lateral edges of the support block, i.e. the width of the block exceeds the length of the groove. The source of lubricant comprises bore 20 in the support block which interconnects groove 18 with a lubricant supply a.

As will be best seen in FIGS. 6 and 7, circular channels 24 are formed at the intersections between the raceway and flanges 14. Inclined or wedge-shaped cavities 22 are formed in the lateral edges of support block 10 or its lining 16 to form passages in communication with respective ends of groove 18. As will be seen from a consideration of the two extreme positions shown in FIGS. 6 and 7, the openings of passages 22 can place groove 18 in communication with circular channels 24, these openings being at least partially covered by the raceway. The openings are substantially of the same size when the support block is centered between the flanges. As shown in FIG. 6, the openings increase in size and the support block is displaced laterally in the direction of the respective opening, the size of the opening attaining its maximum when the lateral edge of the support block contacts the adjacent flange of the raceway, as illustrated in FIG. 6. In this position and as shown in FIG. 7, the opposite passage is fully covered by the raceway so that there is no communication between passage 22 and associated channel 24. In intermediate positions of support block 10 between flanges 14, 14 groove 18 communicates with both channels 24. This permits lubricating oil to flow from groove 18 to channels 24 and then into lateral cavities 19 to assure full lubrication of the lateral edges of the support block in contact with the flanges of the raceway.

The advantage of the lubricating arrangement resides in the fact that the oil flow increases as the lateral edge of the support block approaches the adjacent flange so that the contacting surfaces will be well lubricated. In effect, the axial movement of support block 10 in relation to body 12 increases the size of the opening placing lubricating groove 18 into communication with associated channel 24 while correspondingly decreasing that of the lubricating passage at the other edge. Thus, the lubrication increases and decreases according to operating requirements. As shown in FIG. 7, when the lateral edge of the support block is farthest removed from the adjacent flange, no lubricant at all flows into the associated channel 24, thus permitting a maximum flow of oil into the opposite channel (FIG. 6) where the surfaces of the support block and flange are in gliding contact.

The apparatus of the present invention is useful for rotatably supporting any body of large diameter, such as tubular crushers, rotary kilns and the like. The lubricant may be hydrodynamic or hydrostatic oil.

I claim:

1. Apparatus for supporting a body of large diameter for rotation about an axis, the body having a pair of circular flanges defining therebetween an annular raceway coaxial with the axis of rotation, circular channels being formed at the intersections between the raceway and flanges, comprising
   a. a stationary support frame,
   b. a support block glidingly contacting the annular raceway,
      1. the spacing between the flanges being such as to provide some axial play between the flanges and the support block,
   c. means for feeding a lubricant to the interspace between the flanges and the support block, the lubricant feeding means including
      1. a transverse groove extending in the direction of the axis and recessed in the gliding surface of the support block,
      2. a source of lubricant in communication with the groove for feeding lubricant thereto, and
      3. passages in communication with the gliding surface and having openings adjacent respective lateral edges of the support block for placing the groove in communication with the circular channels, the openings being at least partially covered by the raceway so that the openings are substantially of the same size when the support block is centered between the flanges and that they increase in size as the support block is displaced laterally in the direction of the respective opening, and
   d. a swivel joint mounting the support block on the support frame.

2. The apparatus of claim 8, wherein the diameter of the joint is 0.7 to one times the width of the support block.

3. The apparatus of claim 1, wherein the opening of one of the passages is fully covered by the raceway when the opposite lateral edge of the support block is in contact with the adjacent flange.

4. The apparatus of claim 1, wherein the passages are defined by wedge-shaped cavities in the lateral edges of the support block in communication with the groove.

5. The apparatus of claim 1, wherein the lateral edges of the support block define cavities for holding lubricant.

6. The apparatus of claim 1, wherein the pivoting center of the swivel joint is at a distance from the interface between the support block and the raceway not exceeding a tenth of the width of the support block, the width being measured parallel to the axis of rotation.

* * * * *